United States Patent [19]

Ohta et al.

[11] Patent Number: 5,311,587
[45] Date of Patent: May 10, 1994

[54] SENSOR CIRCUIT FOR TELEPHONE LINE

[75] Inventors: Hiroyuki Ohta; Masaaki Sugiyama, both of Nagaokakyo, Japan

[73] Assignee: Murata Manufacturing Co., Ltd., Japan

[21] Appl. No.: 898,086

[22] Filed: Jun. 12, 1992

[30] Foreign Application Priority Data

Jun. 14, 1991 [JP] Japan .................. 3-44897[U]

[51] Int. Cl.[5] ............................................ H04M 1/00
[52] U.S. Cl. .................................. 379/377; 379/378; 379/387; 379/386
[58] Field of Search ............... 379/377, 378, 387, 376, 379/382, 386

[56] References Cited

U.S. PATENT DOCUMENTS

| 3,920,928 | 11/1975 | Lye | 379/376 X |
| 3,920,929 | 11/1975 | Tate | 379/376 |
| 4,366,347 | 12/1982 | Takatsuki et al. | 379/387 X |
| 5,065,088 | 11/1991 | Habiro et al. | 379/378 X |

FOREIGN PATENT DOCUMENTS 63-82366 4/1988 Japan .
3-153156 7/1991 Japan .

Primary Examiner—James L. Dwyer
Assistant Examiner—M. W. Shehata
Attorney, Agent, or Firm—Ostrolenk, Faber, Gerb & Soffen

[57] ABSTRACT

A sensor circuit for telephone line includes a detection coil (52) inserted in a telephone line (22). The coil generates a magnetic flux according to a line current which flows in the telephone line. A magnetic sensor (54) such as a Hall element generates a voltage signal in response to the magnetic flux. An output of the magnetic sensor is applied to a comparing circuit (58) and a tone deriving circuit (60) via an amplifier (56). The comparing circuit includes two comparators one of which compares the voltage signal from the magnetic sensor with a first reference voltage (V1) and the other of which compares the output signal with a second reference voltage (V2), so that a line current supervisory signal is outputted from the comparing circuit. The tone deriving circuit includes a band-pass filter and derives a tone signal from the voltage signal of the magnetic sensor. The line current supervisory signal and the tone signal are applied from terminals (46, 48, 62) to a signal processing circuit (36) by which a facsimile or a telephone set is selectively enabled.

8 Claims, 4 Drawing Sheets

F I G. 2
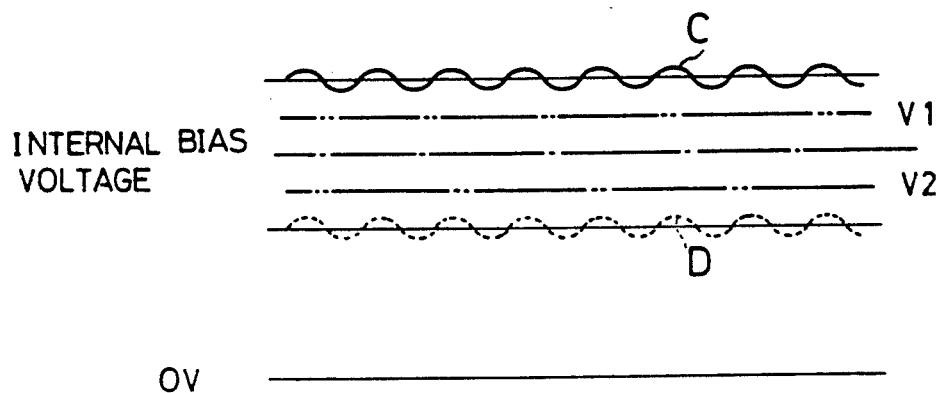
F I G. 3
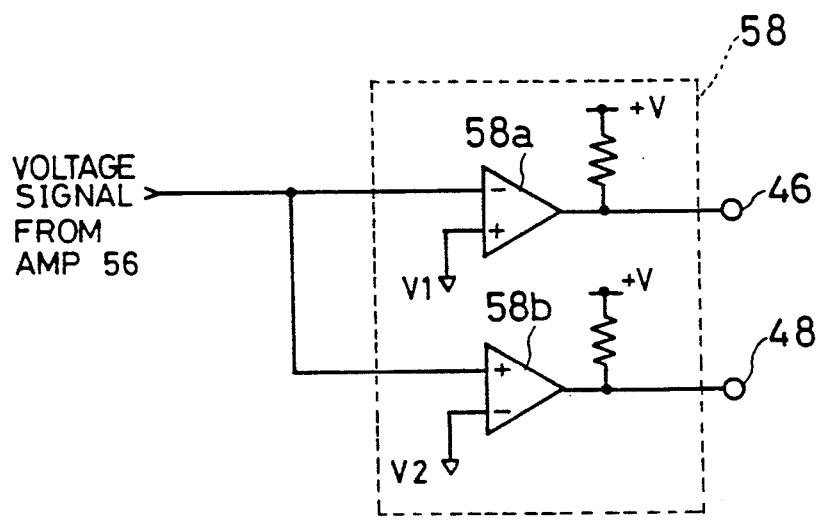

SENSOR CIRCUIT FOR TELEPHONE LINE

BACKGROUND OF THE INVENTION

1. Field of the Invention

The present invention relates to a sensor circuit for a telephone line. More specifically, the present invention relates to a sensor circuit for a telephone line which is provided in a network control unit (NCU).

2. Description of the Prior Art

A circuit diagram of a conventional example of an NCU is shown in FIG. 5. The NCU 10 includes terminals 12 and 14 respectively connected to an intra-office switch (not shown). Relay switches 16 and 18 have movable contacts 16a and 18a and individual contacts 16b and 16c and 18b and 18c, respectively. The movable contact 16a is connected to the terminal 12 via a telephone line 20, and the movable contact 18a is connected to the terminal 14 via a telephone line 22 in which a line current supervisor circuit 24 is inserted. The individual contacts 16b and 18b are connected to both ends of a primary winding 26a of a line transformer 26, respectively. The line transformer 26 includes a secondary winding 26b.

In addition, the individual contacts 16c and 18c are connected to a tone detection circuit 28 which is composed of a capacitor 30 and a line transformer 32. The line transformer 32 includes a primary winding 32a and a secondary winding 32b coupled to the primary winding 32a.

The secondary winding 26b of the 26 is connected to a two-line/four-line (2W/4W) conversion circuit 34 which converts two lines of the telephone line into four lines which are connected to a signal processing circuit 36 incorporated in another electronic device, for example, a facsimile machine. The secondary winding 32b of the line transformer 32 is also connected to the signal processing circuit 36 in the facsimile machine.

The signal processing circuit 36 determines whether an electrical signal flowing in the telephone lines 20 and 22 is a signal for a telephone (not shown) connected to terminals 38 and 40 or a signal for the facsimile machine. When it is determined that the electrical signal is for the telephone, the signal processing circuit 36 controls the relay switches 16 and 18 so as to connect the movable contacts 16a and 18a to the individual contacts 16c and 18c, respectively and, when it is determined that the electrical signal is for the facsimile machine, the movable contacts 16a and 18a are connected to the individual contacts 16b and 18b, respectively by the signal processing circuit 36.

The line current supervisor circuit 24 is inserted in the telephone line 22, as described above. The line current supervisor circuit 24 includes a pair of photocouplers 42 and 44. Photocoupler 42 is composed of a light emitting element 42a which emits a light signal when the line current flows in the direction of arrow A and a light receiving element 42b which receives the light signal emitted by the light emitting element 42a. Photocoupler 44 is composed of a light emitting element 44a which emits a light signal when the line current flows in the direction of arrow B and a light receiving element 44b which receives the light signal emitted from the light emitting element 44a. Signals from the light receiving elements 42b and 44b are output at terminals 46 and 48, respectively, and the terminals 46 and 48 are connected to a detection circuit (not shown) for detecting an on state or an off state of a hook switch (not shown) of the telephone and the signal processing circuit 36.

Then, if the hook switch is turned off by releasing a hand of the telephone set, the line current flows in the direction of arrow A, and therefore, the light emitting element 42a emits a light signal which is then received by the light receiving element 42b. Therefore, an output signal is applied to the signal processing circuit 36 via the terminal 46. On the other hand, if the line current flows in the direction of arrow B, the light emitting element 44a emits a light signal which is then received by the light receiving element 44b. Therefore, an output signal is applied to the signal processing circuit 36 via the terminal 48.

As described above, the conventional example of the NCU shown in FIG. 5 includes the line current supervisor circuit 24 and a separate tone detection circuit 28. The tone detection circuit 28 includes the line transformer 32 which is large and expensive. The line current supervisor circuit 24 is constructed by the photocouplers 42 and 44, as described above. Therefore, if the line current supervisor circuit 24 and the tone detection circuit 16 are individually mounted on a circuit board, a substantially large space is required for mounting these circuits, and therefore, the NCU itself becomes large and the cost thereof also becomes high.

SUMMARY OF THE INVENTION

Therefore, a principal object of the present invention is to provide a novel sensor circuit for a telephone line.

Another object of the present invention is to provide a sensor circuit for a telephone line which requires only a small mounting space.

Another object of the present invention is to provide an inexpensive sensor circuit for a telephone line.

In brief, a sensor circuit for a telephone line according to the present invention comprises line current detecting means for magnetically detecting a line current flowing in a telephone line; line current supervisor means for outputting a supervisory output of the line current on the basis of a detection signal outputted by the line current detecting means; and tone deriving means for deriving a tone signal from the detection signal outputted by the line current detecting means which indicates that a tone signal is superposed on the line current.

The line current detecting means includes, for example, a detection coil inserted in the telephone line and a magnetic sensor such as a Hall element magnetically coupled to the detection coil. Therefore, the magnetic sensor, that is, the line current detecting means, outputs a detection signal according to the line current flowing in the telephone line. The detection signal outputted from the line current detecting means is applied to the line current supervisor means and the tone deriving means, respectively.

According to the present invention, because the line current supervisor means outputs a supervisory signal of the line current on the basis of the detection signal from the line current detecting means and the tone deriving means derives the tone signal from the same detection signal output from the line current detecting means, it is possible to reduce the number of components for a sensor circuit for a telephone line. Accordingly, it is possible to obtain an inexpensive NCU that requires a relatively small space.

BRIEF DESCRIPTION OF THE DRAWINGS

FIG. 2 is a waveform chart showing a voltage signal outputted from an amplifier shown in FIG. 1;

FIG. 3 is a circuit diagram showing a comparing circuit shown in FIG. 1;

DETAILED DESCRIPTION OF THE PREFERRED EMBODIMENTS

Figure 1:
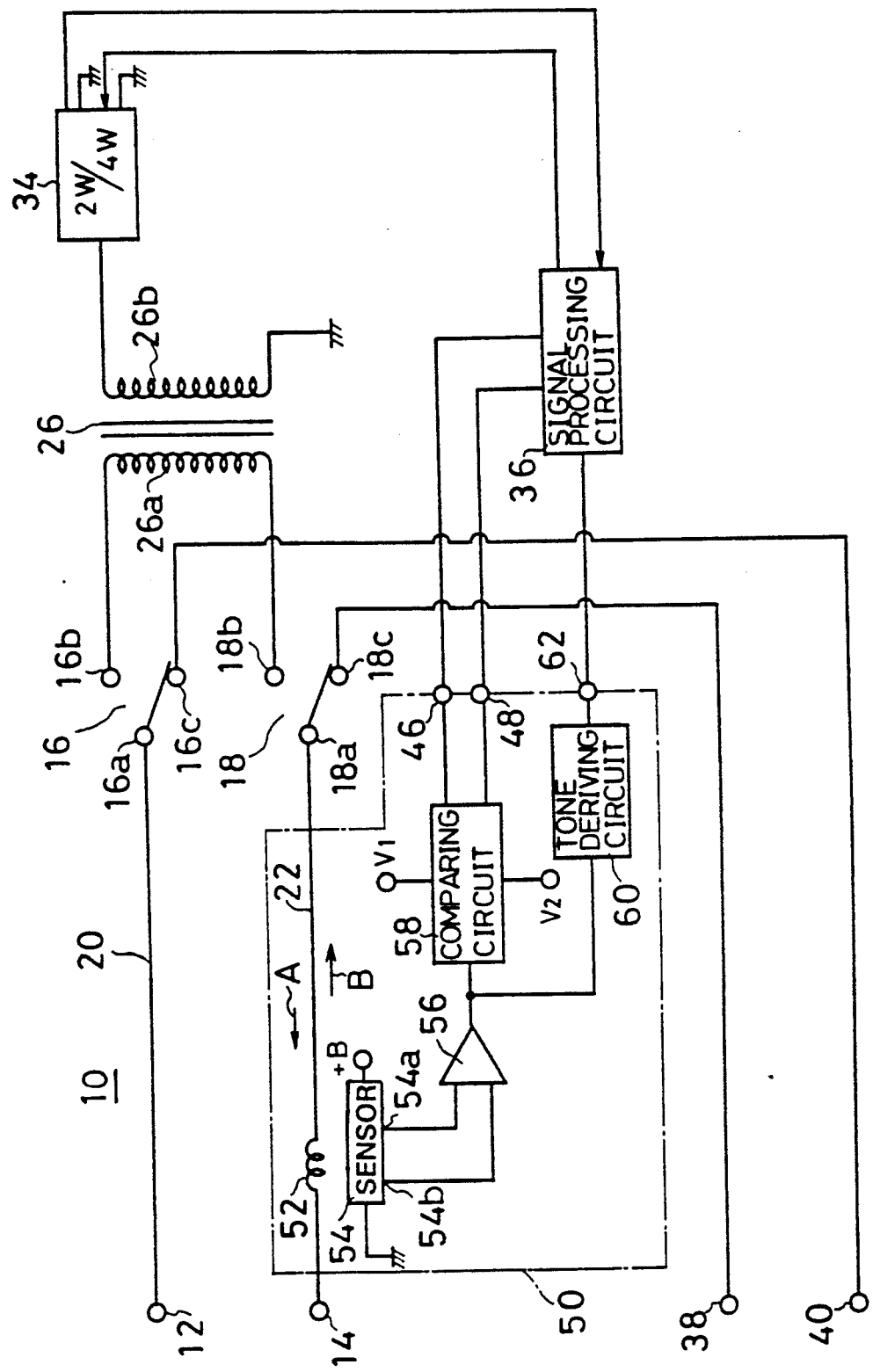
FIG. 1 is a circuit diagram showing one embodiment according to the present invention.

FIG. 1 is a circuit diagram showing one embodiment according to the present invention; however, the same reference numerals are used for designating the same components as that of FIG. 1, and therefore, a detailed description of these components will be omitted here.

A sensor unit 50 of this invention shown in FIG. 1 includes a detection coil 52 and a magnetic sensor 54 which constitutes a line current detecting means; an amplifier 56; a comparing circuit 58 which constitutes a line current supervisory means; and a tone deriving circuit 60. These components are incorporated in a single unit.

The detection coil 52 generates a magnetic signal (magnetic flux) according to a flowing direction of the line current. The magnetic sensor 54 includes a Hall generated by the detection coil 52. The magnetic sensor 54 outputs a voltage signal corresponding to the magnetic signal received between output ends 54a and 54b. The amplifier 56 is composed of a differential amplifier, for example, and amplifies the voltage signal received from the output ends 54a and 54b.

A voltage signal as amplified by the amplifier 56 is shown in FIG. 2. In FIG. 2, a solid line C shows the voltage signal from the amplifier 56 at a time when the line current flows in the telephone line 22 in a direction of one of the arrows A and B. A dotted line D shows the voltage signal at a time when the line current flows in a direction of the other of the arrows A and B. In addition, FIG. 2 shows a state where a tone signal (alternating current component) is superposed on a direct current component. However, if no alternating current component is superposed, the voltage signal outputted from the amplifier 56 includes only the direct current voltage shown by a thin solid line in FIG. 2.

The comparing circuit 58 includes two comparators 58a and 58b as shown in FIG. 3. The comparator 58a receives the voltage signal outputted from the amplifier 56 at a (−) input and a reference voltage V1 at a (+) input. The comparator 58b receives the same voltage signal at a (+) input and a reference voltage V2 at a (−) input. Therefore, the voltage signal shown by the solid line C in FIG. 2 is compared with the reference voltage V1 shown in FIG. 2 by a two-dotted line by the comparator 58a. The comparator 58a outputs a low level signal when the voltage signal is larger than the reference voltage V1. On the other hand, the voltage signal shown by the dotted line D in FIG. 2 is compared with the reference voltage V2 shown in FIG. 2 by a two-dotted line by the comparator 58b. If the voltage signal is smaller than the reference signal V2, a low level signal is outputted from the comparator 58b. Thus, the low level signal is outputted from the comparator 58a when the line current of a predetermined magnitude flows in the direction of arrow A or B, and the low level signal is outputted from the comparator 58b when the line current of a predetermined magnitude flows in the direction of arrow B or A.

In addition, when the line current does not flow in the telephone line 22 or a magnitude of the line current is small and thus, the voltage signal is smaller than the reference voltage V1, a high level signal is outputted from the comparator 58a. If the voltage signal is larger than the reference voltage V2, high level signals are outputted from the comparators 58a and 58b.

The above described signals are applied to the signal processing circuit 36 via terminals 46 and 48 as line current supervisory signals.

Figure 4:
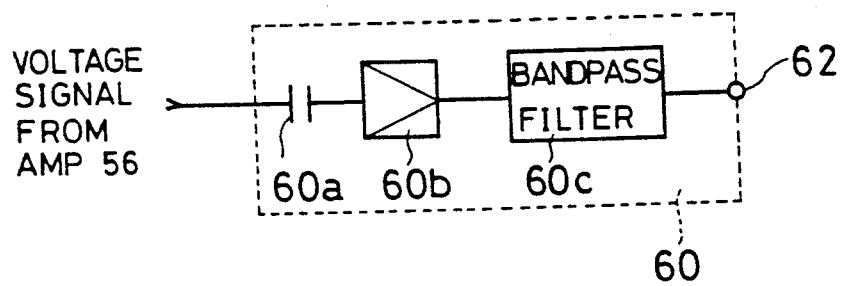
FIG. 4 is a circuit diagram showing a tone deriving circuit shown in FIG. 1.
Figure 5:
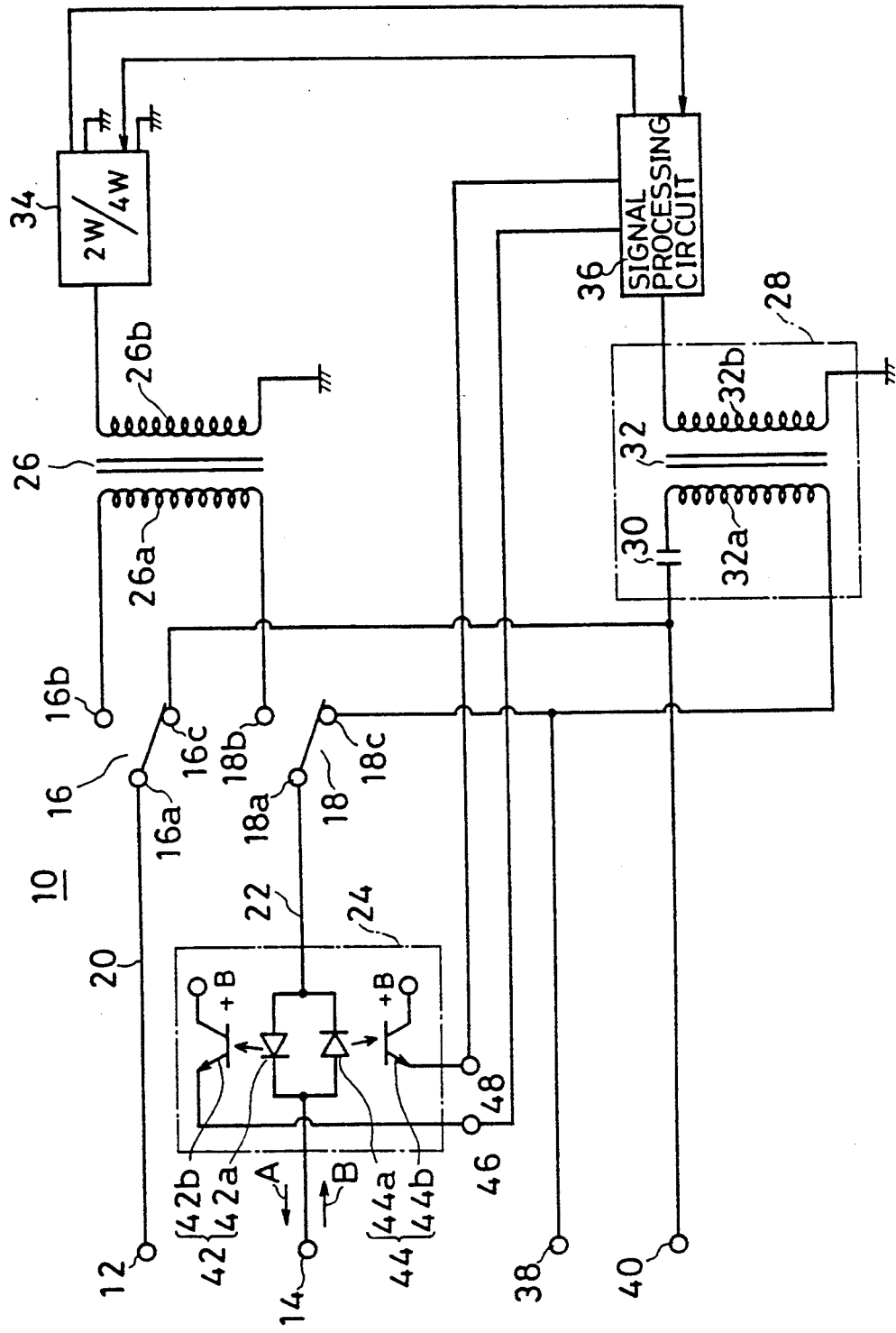
FIG. 5 is a circuit diagram showing one example of a conventional sensor circuit.

As shown in FIG. 4, the tone deriving circuit 60 includes a coupling capacitor 60a for cutting-off a direct current component, an amplifier 60b, and a band-pass filter 60c having a pass-band of 400–1700 Hz, for example. Therefore, the direct current component included in the voltage signal outputted from the amplifier 56 is removed by the capacitor 60a, and only an alternating current component shown in FIG. 2 is amplified by the amplifier 60b and inputted to the filter 60c. Therefore, if a tone signal of 1100 Hz, for example, which corresponds a facsimile network signal indicating that a facsimile is to be used, is included in the voltage signal, the tone signal is outputted from the filter 60c to be applied to the signal processing circuit 36 via a terminal 62.

If a frequency detector (not shown) is connected to the output of the tone deriving circuit 60, it is possible to determine the type of the tone signal, that is, whether the tone signal which is derived is the calling signal, the facsimile network signal, or the like. In a practical circuit, such a frequency detector is inserted between the tone deriving circuit 60 and the signal processing circuit 36, i.e., the microcomputer.

Furthermore, the signal processing circuit 36 is composed of a microcomputer which mainly controls the relay switches 16 and 18 on the basis of the line current supervisory signal at the terminals 46 and 48 and the tone signal at the terminal 62.

More specifically, if a telephone set is to be used, the line current is flowing in the telephone line 22 in the direction of arrow A or B direction, and therefore, the low level signal is outputted from the comparator 58a or 58b, i.e., from the comparing circuit 58, and no tone signal is inputted from the terminal. Therefore, the microcomputer controls the relay switches 16 and 18 so that the movable contacts 16a and 18a can be connected to the individual contacts 16b and 18b, respectively.

If a facsimile machine is to be used, the line current flows in the direction of arrow A or B, and therefore, the low level signal is outputted from the comparators 58a or 58b, respectively, and a tone signal is detected by and output from the tone signal deriving circuit 60, that is, from the terminal 62. Accordingly, when the tone signal is output from the tone deriving circuit 60 to the signal processing circuit 36, the microcomputer controls the relay switches 16 and 18 so that the movable contacts 16a and 18a can be connected to the individual contacts 16c and 18c, respectively.

In addition, in the above described embodiment, the band-pass filter 60c is connected to the output of the amplifier 60b. However, a connection order of the amplifier 60b and 60c may be inverted. That is, the band-pass filter 60c may be connected to the input of the amplifier 60b so that the tone signal is outputted from the amplifier 60b to the terminal 62.

Furthermore, in the above described embodiment, the tone deriving circuit 60 is incorporated in the single unit 50 together with the comparing circuit 58. However, the comparing circuit 58 and the tone deriving circuit 60 may be separated from each other. For example, a single unit may be formed by omitting the tone deriving circuit 60.

In addition, the amplifier 60b is used in the above described embodiment, and therefore, by functionally trimming a resistance value of a resistor internally connected to an operational amplifier or the like in the amplifier 60b, it is possible to easily adjust or correct a fluctuation of the output voltage signal from the magnetic sensor 54.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A sensor circuit for sensing a line current in a telephone line that is connectable to one of a telephone and a facsimile machine, the sensor circuit comprising:
   a) line current detecting means for magnetically detecting a line current which flows in the telephone line and outputting a detection signal corresponding to the line current detected by the line current detecting means, the line current detecting means including:
      1) magnetic signal generating means for generating a magnetic signal according to the line current; and
      2) magnetic signal detecting means for detecting the magnetic signal generated by the magnetic signal generating means to output a voltage signal;
   b) first means for outputting a line current supervisory signal on the basis of the detection signal, the first means including:
      1) comparing means for comparing the detection signal output from the line current detecting means with at least one reference signal;
   c) second means for deriving a tone signal from the detection signal, the derived tone signal indicating that the line current in the telephone line is to be sent to the facsimile machine and that the telephone line is to be connected to the facsimile machine, the second means including:
      1) direct current component removing means for removing a direct current component from the detection signal output from the line current detecting means; and
      2) filter means for filtering an output of the direct current removing means so as to derive a tone signal.

2. A sensor circuit according to claim 1, wherein the magnetic signal generating means includes a detection coil means inserted in the telephone line.

3. A sensor circuit according to claim 2, wherein the magnetic signal detecting means includes a Hall element.

4. A sensor circuit according to claim 1, wherein the comparing means includes two comparators, one of which compares the detection signal with a first reference signal and the other of which compares the detection signal with a second reference signal which is different from the first reference signal.

5. A sensor circuit according to claim 1, wherein the filter means includes a band-pass filter, and the second means further includes amplifying means for amplifying a signal inputted to or outputted from the band-pass filter.

6. A sensor circuit for magnetically sensing a line current in a telephone line that is connectable to a telephone and a facsimile machine, the sensor circuit comprising:
   a) line current detecting means for magnetically detecting a line current which flows in the telephone line and outputting a detection signal corresponding to the line current detected by the line current detecting means;
   b) first means for outputting a line current supervisory signal on the basis of the detection signal; and
   c) second means for deriving a tone signal from the detection signal, the derived tone signal indicating that the line current is to be sent to the facsimile machine and that the telephone line is to be connected to the facsimile machine, the second means including:
      1) direct current component removing means for removing a direct current component from the detection signal output from the line current detecting means; and
      2) filter means for filtering an output of the direct current removing means so as to derive a tone signal.

7. A sensor circuit according to claim 6, wherein the filter means includes a band-pass filter, and the second mans further includes amplifying means for amplifying a signal input to or output from the band-pass filter.

8. A sensor circuit for magnetically sensing a line current in a telephone line that is connectable to a telephone and a facsimile machine, the sensor circuit comprising:
   a) line current detecting means for magnetically detecting a line current which flows in the telephone line and outputting a detection signal corresponding to the line current detected by the line current detecting means;
   b) first means for outputting a line current supervisory signal on the basis of the detection signal, the first means including;
      1) comparing means for comparing the detection signal output from the line current detecting means with at least one reference signal, wherein the comparing means includes first and second comparators, the first comparator compares the detection signal with a first reference signal and the second comparator compares the detection signal with a second reference signal which is different from the first reference signal;
   c) second means for deriving a tone signal from the detection signal, wherein the derived tone signal indicates that the line current in the telephone line is to be sent to the facsimile machine and that the telephone line is to be connected to the facsimile machine.

* * * * *